United States Patent
Arai

(10) Patent No.: US 8,304,649 B2
(45) Date of Patent: Nov. 6, 2012

(54) WATERPROOFING METHOD FOR ELECTRIC WIRE AND THE WIRE HAVING WATERPROOF PART FORMED BY THE WATERPROOFING METHOD

(75) Inventor: Masaru Arai, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 300 days.

(21) Appl. No.: 12/740,246

(22) PCT Filed: Jun. 25, 2008

(86) PCT No.: PCT/JP2008/061547
§ 371 (c)(1),
(2), (4) Date: Apr. 28, 2010

(87) PCT Pub. No.: WO2009/060639
PCT Pub. Date: May 14, 2009

(65) Prior Publication Data
US 2010/0212936 A1  Aug. 26, 2010

(30) Foreign Application Priority Data

Nov. 8, 2007 (JP) .................................. 2007-291324
Apr. 10, 2008 (JP) .................................. 2008-102951

(51) Int. Cl.
*H01R 43/00* (2006.01)
(52) U.S. Cl. ..................................................... 174/23 R
(58) Field of Classification Search ................ 174/23 R, 174/74 R, 77 R, 84 C
See application file for complete search history.

(56) References Cited

U.S. PATENT DOCUMENTS

| | | | |
|---|---|---|---|
| 4,434,320 A | 2/1984 | Klein et al. | |
| 5,347,090 A * | 9/1994 | Cerda | 174/84 R |
| 7,053,307 B2 * | 5/2006 | Kossak et al. | 174/84 R |
| 7,612,287 B2 * | 11/2009 | Ichikawa et al. | 174/77 R |
| 2004/0074666 A1* | 4/2004 | O'Grady et al. | 174/84 C |
| 2004/0238200 A1* | 12/2004 | Tanaka et al. | 174/74 R |
| 2011/0048762 A1* | 3/2011 | Sawamura | 174/78 |

FOREIGN PATENT DOCUMENTS

| | | |
|---|---|---|
| JP | 2004-072943 | 3/2004 |
| JP | 2005-080483 * | 3/2005 |
| JP | 2006-228709 | 8/2006 |
| JP | 2007-134054 | 5/2007 |
| JP | 2007-226999 | 9/2007 |
| JP | 2007-287647 | 11/2007 |

* cited by examiner

Primary Examiner — Chau Nguyen
(74) Attorney, Agent, or Firm — Gerald E. Hespos; Michael J. Porco

(57) ABSTRACT

A waterproofing method is provided for a wire to be arranged in a water susceptible area of a vehicle. The method includes removing an insulating coating layer in a lengthwise intermediate part of the wire to expose a core. A fluid waterproofing agent then is dropped to an exposed core section. Negative pressure then is introduced into the inside of the insulating coating layer from wire ends to suck the waterproofing agent into the inside of the insulating coating layer. Alternatively the exposed core section is loaded with pressure air to press the waterproofing agent into the inside of the insulating coating layer. Thus the waterproofing agent is infiltrated between the strands inside the insulating coating layer.

15 Claims, 10 Drawing Sheets

WATERPROOFING METHOD FOR ELECTRIC WIRE AND THE WIRE HAVING WATERPROOF PART FORMED BY THE WATERPROOFING METHOD

BACKGROUND OF THE INVENTION

1. Field of the Invention

The present invention relates to a wire waterproofing method and a wire having a waterproof part formed by the waterproofing method and is particularly designed to be able to apply a waterproof treatment at an arbitrary position of a wire arranged in a water susceptible area of a vehicle.

2. Description of the Related Art

Conventionally, there have been cases where a wiring harness is arranged along a water susceptible area of a vehicle such as a car or a motorcycle. A ground terminal crimped and connected to an end of a ground wire of the wiring harness is grounded by being bolted to a vehicle body in many cases.

If the vehicle, to which the ground terminal is fixed, is located in a water susceptible area, water enters the inside of the ground wire through an exposed core section of the wire crimped and connected to the ground terminal and penetrates to the other end of the ground terminal through clearances of a core made up of a multitude of strands and covered by an insulating coating layer. In this case, a terminal connected to the other end of the ground wire is inserted and locked in a connector in many cases and the penetrating water also enters the connector at the other end of the ground wire, which causes a problem of corroding the terminal in the connector.

For the above problem, various ground wire waterproof treatments have been conventionally proposed.

For example, the assignee of the subject invention proposed to drop a waterproofing agent between an insulating coating barrel 2a and a core barrel 2b of a ground terminal 2 crimped and connected to an end of a ground wire 1 as shown in FIG. 12 of Japanese Unexamined Patent Publication No. 2006-228709, and air inside an insulating coating layer is sucked from the other end of the ground wire 1 to reduce pressure. In this way, the dropped waterproofing agent 3 is infiltrated into the inside of the insulating coating layer to fill clearances of cores made up of a plurality of strands, thereby preventing water penetration from a connecting portion with the ground wire 2 into the inside of the ground wire 1.

Also in JP 2007-134054, a waterproofing agent is dropped to a ground terminal at an end of a ground wire and air inside the ground wire is sucked to infiltrate the waterproofing agent into the inside of the ground wire by a similar method. In JP 2007-134054, a leakage preventing wall 4b is arranged between both side walls 4a of a jig 4 and the waterproofing agent 3 is dropped with the leakage preventing wall 4b held in close contact with opposite side surfaces of the ground terminal 2 as shown in FIG. 13 in order to position the ground terminal 2 and prevent the lateral leakage of the waterproofing agent.

As described above, in each of the waterproofing methods of JP 2006-228709 and JP 2007-134054, the waterproofing agent is dropped to the exposed core section of the ground terminal at the end of the ground wire and a waterproofed position by the waterproofing agent is located at the ground terminal at the end of the ground wire. In other words, it is supposed that the ground terminal is crimped and connected to the end of the ground wire and the ground terminal is bolted to a body panel. In this way, the measures of patent documents for waterproofing the ground wire suppose that the ground terminal crimped and connected to the end of the ground wire is fixed to the body panel.

However, depending on vehicles, it is difficult in some cases to ensure a place where a ground terminal is fixed. In such a case, the ground wire has to be extended up to the place where the ground terminal can be fixed and unnecessary handling of the ground wire is required. In addition, if the ground wire is unnecessarily made longer, a possibility of the ground wire being interfered with and damaged by an external interfering member is increased by that much. Even if a waterproof treatment is applied at an end position connected with the ground terminal, water may enter at a damaged position and penetrate to a connector connecting portion at the other end of the ground wire if the ground wire is damaged at an intermediate position.

Further, the jig for positioning the ground terminal and preventing the leakage of the dropped waterproofing agent is necessary at the time of dropping the waterproofing agent to the ground terminal as disclosed in JP 2007-134054. Since this jig needs to be provided for each size of ground terminals, equipment cost increases, which leads to an increase of production cost. In view of these points, there is a room for improvement.

In view of the above problems, a first object of the present invention is to reliably prevent water penetration into a connector connecting portion by applying a waterproof treatment not at the position of a ground terminal to be bolted to a vehicle body, but at an arbitrary position of a wire to be arranged in a water susceptible area, thereby enabling the waterproof treatment to be applied at as close a position as possible to the wire connected to a connector.

A second object of the present invention is to reduce equipment cost for a waterproof treatment by enabling a waterproofing agent reservoir to be formed in an exposed core section of a wire having an insulating coating layer removed without necessitating a jig or the like in conformity with the size of the ground terminal as in JP 2007-134054.

SUMMARY OF THE INVENTION

In order to solve the above problems, the present invention is directed to a wire waterproofing method for a wire to be arranged in a water susceptible area of a vehicle, characterized in that: the wire is such that a core made up of a plurality of strands is covered by an insulating coating layer, the insulating coating layer is removed in a lengthwise intermediate part of the wire to expose the core, and a fluid waterproofing agent is dropped to the exposed core section and at the time of or after the dropping of the waterproofing agent: the waterproofing agent is infiltrated into clearances between the strands of the exposed core section, negative pressure is introduced into the inside of the insulating coating layer from wire ends to suck the waterproofing agent into the inside of the insulating coating layer or the exposed core section is loaded with positive pressure larger than atmospheric pressure to press the waterproofing agent into the inside of the insulating coating layer, and the waterproofing agent is also infiltrated between the strands of the core inside the insulating coating layer.

Specifically, if the wire to be waterproofed at an intermediate position is a ground wire and a ground terminal is connected with an end of the ground wire opposite to a connector connecting side and bolted to a vehicle body to be grounded, a waterproof treatment is not applied at the position of the ground terminal as disclosed in patent documents 1 and 2 and is instead applied at an arbitrary position between both ends of the ground wire, preferably at a position close to the end at a connector connecting side.

The wire to be waterproofed according to the present invention is not limited to a ground wire and may be a power wire or a signal wire to be arranged in a water susceptible area and desired to be waterproofed.

Since the above wire waterproofing method of the present invention can apply the waterproof treatment to the lengthwise intermediate part of the wire, unnecessary handling of the wire can be dispensed with and water penetration into a connector can be more reliably prevented by applying the waterproof treatment at the intermediate position of the wire close to the connector connecting side.

Particularly, an advantage of being able to apply a waterproof treatment at an arbitrary intermediate position of a wire is large for wiring harnesses to be arranged in motorcycles since the motorcycles have smaller arrangement spaces for wiring harnesses than cars and include more water susceptible areas.

The exposed core section, to which the waterproofing agent is to be dropped, can be positioned by fixedly holding a part of the wire including the intermediate part of the wire to be waterproofed. In addition, the exposed core section, to which the waterproofing agent is to be dropped, is located between the end surfaces of the insulated coating layer parts at the opposite ends and this sandwiched part serves as a waterproofing agent reservoir. Thus, the amount of the waterproofing agent to be pooled in the waterproofing agent reservoir can be fixed and, even if the waterproofing agent dropped into the waterproofing agent reservoir from above leaks toward the opposite sides along the strands, it is not necessary to prevent the flow of the waterproofing agent using a jig or the like since the negative pressure is introduced into the insides of the insulated coating layer parts at the opposite sides to suck the waterproofing agent into the insides of insulating coating portions at the opposite sides or the waterproofing agent reservoir is loaded with pressure air to actively press the waterproofing agent into the insides of the insulating at the opposite sides.

Preferably, an intermediate terminal is connected to a part of the exposed core section by crimping, welding, fusing or soldering while being spaced apart from an end surface of a part of the insulating coating layer abutting on the exposed core section at one end side, the exposed core section located between one end surface of the intermediate terminal and the end surface of the part of the insulating coating layer at the one end side serves as a waterproofing agent reservoir, and the negative pressure is introduced from the other end of the part of the insulating coating layer at the one end side to suck the waterproofing agent into the inside of the part of the insulating coating layer at the one end side or the waterproofing agent reservoir is loaded with pressure air larger than atmospheric pressure to press the waterproofing agent into the inside of the part of the insulating coating layer at the one end side.

If the intermediate crimping terminal is crimped and connected to the exposed core section at the intermediate position as described above, clearances between the strands tightened by the intermediate crimping terminal can be eliminated and water penetrating in the clearances between the strands can be blocked at the crimped position of the intermediate crimping terminal. Thus, the penetration of water from the ground terminal side to the connector connecting side can be reliably blocked at the crimped position of the intermediate crimping terminal.

Regardless of whether the intermediate terminal is connected with the exposed core section by welding, fusing or soldering, the clearances between the strands of the exposed core section can be eliminated and water penetrating in the clearances between the strands can be blocked at the position of the intermediate terminal.

The exposed core section exposed by removing the insulating coating layer is formed by forming a slit in the insulated coating layer and moving the insulated coating layer part at one side of the position of slit in many cases. In these cases, the insulated coating layer part returns from the moved position due to its resiliency to shorten the length of the exposed core section. Thus, if the intermediate terminal is connected to the exposed core section by crimping, welding, fusing or soldering, the waterproofing agent reservoir of a fixed dimension can be ensured between the intermediate terminal and the insulated coating layer part at the other side that was not moved. Since the length of the waterproofing agent reservoir can be kept constant in this way, the waterproofing agent to be dropped can be quantitatively controlled.

In addition, the waterproofing agent can be infiltrated only into the inside of the insulated coating layer part at one end side requiring the infiltration of the waterproofing agent, wherefore the waterproofing agent is not wasted.

If the intermediate crimping terminal is crimped and connected to the exposed core section, a dedicated or individual intermediate crimping terminal needs not be used and the intermediate crimping terminal can be commonly used even if materials and thicknesses of insulated coating layers differ if strand constructions of cores are substantially same. In this respect, parts cost and equipment cost can be reduced more than in the case of a waterproof treatment at a ground terminal where a different jig needs to be used if the size of the ground terminal differs.

The waterproofing agent may be dropped to an exposed core section between the other end surface of the intermediate terminal and an end surface of a part of the insulating coating layer at the other end side, and the negative pressure may be introduced from the wire end at the other end side to suck the waterproofing agent into the inside of the insulating coating layer or pressure air may be charged to press the waterproofing agent.

If the wire is a ground wire and a ground terminal is connected with the other end of the ground wire, a waterproof treatment needs not be applied by dropping the waterproofing agent to the exposed core section at the other end side. However, in the case of a power wire or a signal wire having a connector connecting terminal also crimped and connected to the other end thereof, the waterproofing agent is infiltrated into the clearances between the strands of the exposed core section as at the one end side and the negative pressure is introduced into the inside of the insulated coating layer to infiltrate and fill the waterproofing agent also between the strands of the core inside the insulating coating layer. Alternatively, the pressure air is charged to press the waterproofing agent. In this way, the prevention of water penetration to the both ends of the wire can be guaranteed.

Specifically, the negative pressure is introduced into the inside of the insulated coating layer from the wire ends at the time of or after the dropping of the waterproofing agent. In this case, air inside the insulated coating layer is sucked to reduce pressure by connecting the wire ends to air suction hoses, connecting the air suction hoses to a suction pump and controlling a suction force of the suction pump.

On the other hand, in the case of pressing the waterproofing agent dropped to the exposed core section using the pressure air, it is preferable that a part of the wire where the waterproofing agent was dropped and the insulated coating layer parts at the opposite sides of the part where the waterproofing agent was dropped are positioned in a pressurized container communicating with a pressure feed pipe connected with a compressor and permitting the wire to be inserted therethrough in a sealed state and pressure air of 50 to 300 km/cm$^2$ is supplied from the pressure feed pipe to press the dropped waterproofing agent into the insides of the insulated coating layer parts.

In the case of crimping and connecting the intermediate crimping terminal to the exposed core section, the intermediate crimping terminal includes a core barrel to be crimped and connected to the strands of the exposed core section at one end of a base plate and an insulating coating barrel at the other end of the base plate at a distance equal to the length of the waterproofing agent reservoir from the core barrel, and the insulating coating barrel is crimped and connected to the insulating coating layer.

Further, bent wall portions may be provided at the opposite widthwise sides of the base plate located at the lower surface of the waterproofing agent reservoir between the barrels at the both sides to surround a lower part of the exposed core section by the wall portions and the base plate.

If the insulating coating barrel is provided at the other end of the intermediate crimping terminal, the crimped position of the core barrel can be specified by the crimped position of the insulating coating barrel to the insulated coating layer and the length of the waterproofing agent reservoir can be reliably fixed.

In addition, if the base plate connecting the insulating coating barrel and the core barrel at the opposite sides is provided with side walls to have a U-shaped cross section and the exposed core section as the waterproofing agent reservoir is surrounded by the U-shaped part, the dropping waterproofing agent can be prevented from leaking sideways. Thus, the leakage of the waterproofing agent can be prevented without using a jig required in the above JP 2006-228709.

In the case of dropping the waterproofing agent to the respective exposed core sections between the both ends of the intermediate crimping terminal and the insulated coating layer parts at the both ends of the exposed core sections, the intermediate crimping terminal includes a core barrel, which is to be crimped and connected to the strands of the exposed core section, in a central part of the base plate and insulating coating barrels at the both ends of the base plate at distances equal to the lengths of the exposed core section from the core barrel. In addition, the base plate connecting the core barrel in the center and the insulating coating barrels at the opposite sides is preferably provided with side walls as described above so as to be able to prevent the leakage of the waterproofing agent being dropped to the exposed core sections.

It is sufficient for the waterproofing agent to be fluid. Silicone resin is most suitably used.

Instead of silicone resin, silicone rubber, grease or viscous and resilient adhesive is suitably used. There are silicone resin of two-liquid type and silicone resin of one-liquid type, and either type may be used if it is fluid for a required time. The one-liquid type with a longer hardening time is more preferable. Since the waterproofing agent is dropped, silicone resin of one-liquid type is preferably used.

The present invention is also directed to a wire comprising a waterproof part formed by the above waterproofing method.

The wire of the present invention including the waterproof part at an intermediate position can be used as a wire to be arranged in a water susceptible area, but is most preferably applicable when the wire is a ground wire.

For example, if the wire is a ground wire having one end connected with a ground terminal and the other end connected with a connector connecting terminal and the ground terminal is to be fixed to a body panel in a water susceptible area, the waterproof part formed by the waterproofing method is provided at an intermediate position close to a connector connecting portion at the other end of the ground wire, and negative pressure is introduced from an end at the side of the connector connecting portion to infiltrate and fill the waterproofing agent into clearances between strands inside an insulating coating layer at a connector connecting side. Alternatively, the part where the waterproofing agent is dropped is loaded with pressure air to infiltrate and fill the waterproofing agent between the strands.

If the wire is a power wire or a signal wire having one end connected with a connector connecting terminal and spliced to another wire in a water free area and a connector connecting terminal is connected with an end of the spliced other wire, the waterproof part is provided at an intermediate position between a spliced position and the end connected with the connector connecting terminal, and the waterproofing agent is filled into the exposed core section of the waterproof part and between the strands inside the insulating coating layer parts at the opposite sides of the exposed core section.

If the above construction is employed, water may penetrate to the spliced side unless a waterproof treatment is applied to a side of the waterproof part toward the spliced position. By applying the waterproof treatment to the both sides, water penetration to the other wire spliced in the water free area can be reliably blocked and no waterproof treatment is necessary at the spliced portion.

A waterproof sheet or a waterproof tape is preferably wound around the waterproof part.

Specifically, since the waterproofing agent can be reliably infiltrated and filled into the clearances between the stands of the core in the waterproof part formed by the inventive waterproofing method, water penetration can be prevented even if the waterproof part is left exposed. However, it is preferable to protect the waterproof part by winding the waterproof sheet or the waterproof tape in order to protect the waterproof part from an external interfering member and to prevent the contact with an external interfering member when an intermediate crimping terminal is mounted.

As described above, in the wire waterproofing method of the present invention, the waterproof treatment can be applied at an arbitrary lengthwise position of the wire, thereby increasing a degree of freedom in design. In addition, since no waterproof treatment needs to be applied at the position of the ground terminal as disclosed in JP 2006-228709 and JP 2007-134054, the waterproof treatment can be applied not only to a wire connected with a ground terminal to be fixed to a body panel, but also any arbitrary wire. Thus, unnecessary handling of the wire can be dispensed with. Further, since the waterproof part can be formed at the intermediate position close to the connector connecting side where the waterproof treatment is necessary, the connector connecting side can be waterproofed with increased reliability.

Further, since the waterproof treatment is applied at the intermediate position of the wire, the jig for positioning the ground terminal disclosed in JP 2007-134054 becomes unnecessary and, hence, equipment cost for the waterproof treatment can be reduced.

If the intermediate crimping terminal is crimped and connected to the exposed core section to be waterproofed, the clearances between the strands of the core can be reliably eliminated in this crimped part. Also in the case of welding, fusing or soldering the intermediate terminal, water penetrating between the strands can be reliably blocked by eliminating the clearances between the strands. In the case of an intermediate crimping terminal, it can be commonly used if core constructions are substantially same. Therefore, the number of parts can be reduced.

BRIEF DESCRIPTION OF THE DRAWINGS

FIGS. 11(A) and 11(B) show a modification of the fifth embodiment, wherein FIG. 11(A) is a perspective view of a waterproof part and FIG. 11(B) is a perspective view of an intermediate crimping terminal.

DETAILED DESCRIPTION OF THE PREFERRED EMBODIMENTS

Hereinafter, embodiments of the present invention are described with reference to the drawings.

Figure 1A:
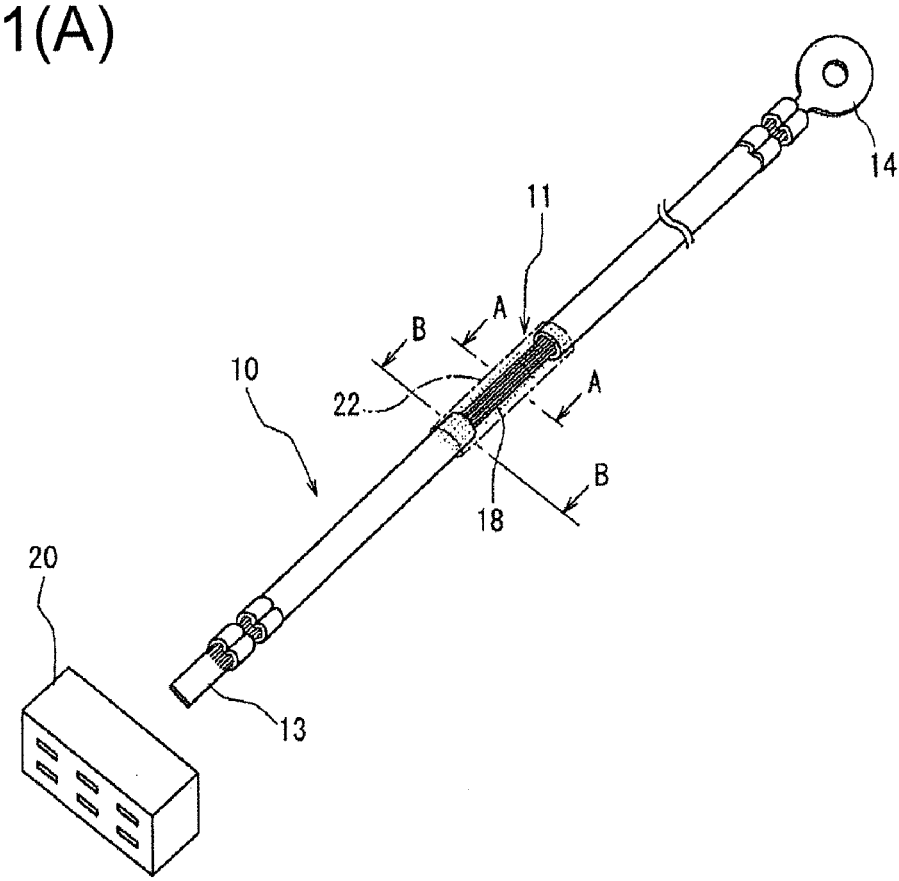
FIG. 1(A) is an overall view of a wire including a waterproof part according to a first embodiment of the invention and FIG. 1(B) is an enlarged view of the waterproof part with a waterproof sheet removed.
Figure 1B:
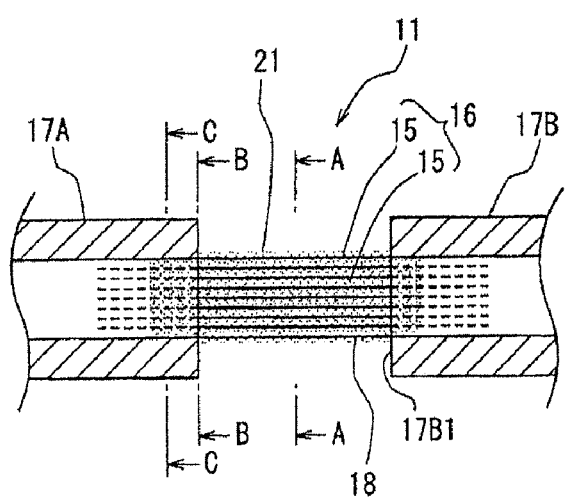
Figure 2A:
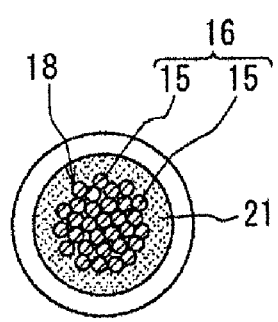
FIG. 2(A) is a section along A-A of FIG. 1(B)
Figure 2B:
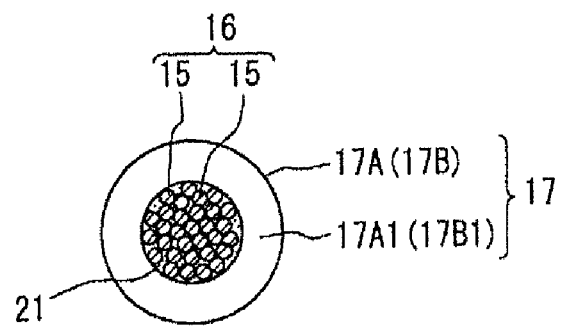
FIG. 2(B) is a section along B-B of FIG. 1(B) and FIG. 2(C) is a partial enlarged section along C-C of FIG. 1(B).
Figure 2C:
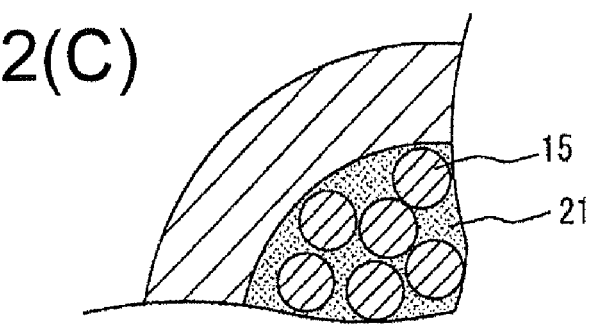

FIGS. 1 to 3 show a first embodiment.

In the first embodiment, a wire 10 for a ground circuit arranged in a water susceptible area is provided with a waterproof part 11.

The wire 10 has one end crimped and connected to a terminal 13, which is to be inserted and locked in a connector 20, and the other end crimped and connected to a ground terminal 14. The waterproof part 11 is formed at an intermediate position closer to the connector connecting terminal 13 than to the ground terminal 14.

As shown in FIG. 2(B), the wire 10 is composed of a core 16 formed by twisting a multitude of strands 15 and an insulating coating layer 17 surrounding the core 16 and made of insulating resin.

Figure 3A:
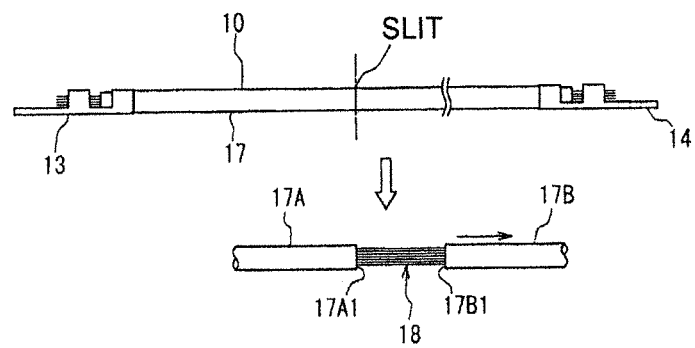
FIGS. 3(A) to 3(D) are diagrams showing a process of forming the waterproof part of the first embodiment.

In the waterproof part 11 of the wire 10, a slit is formed in the insulating coating layer 17 and an insulating resin layer 17B at a side of the slit toward the ground terminal is moved to form an exposed core section 18 having the insulating resin layer removed between a slit end surface 17B1 of the insulating resin layer 17B and a slit end surface 17A1 of an insulating resin layer 17A at the other side as shown in FIG. 3(A).

A waterproofing agent 21 made of silicone resin is dropped to the exposed core section 18 and infiltrated and filled into clearances between the strands 15 of the exposed core section 18. The waterproofing agent 21 is also infiltrated into the insides of the insulating resin layers 17A, 17B at the opposite ends of the exposed core section 18 from the slit end surfaces 17A1, 17B1, thereby filling the waterproofing agent 21 also into clearances between the strands 15 of the core 16 inside these insulating resin layers 17A, 17B.

A waterproof sheet 22 having an adhesive applied thereto is wound around and fixed to the exposed core section 18 filled with the waterproofing agent 21.

Next, a method for forming the waterproof part 11 is described with reference to FIG. 3.

As shown in FIG. 3(A), the wire 10 having the one end crimped and connected to the connector connecting terminal 13 and the other end crimped and connected to the ground terminal 14 has the insulating coating layer 17 removed at a required position as described above, thereby forming the exposed core section 18.

Figure 3B:
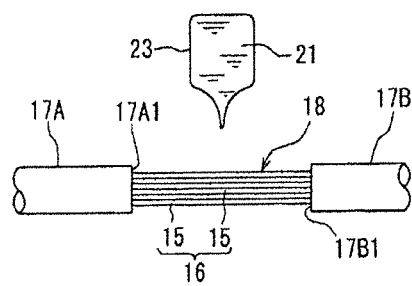

Subsequently, as shown in FIG. 3(B), the wire 10 is so held that the exposed core section 18 is located below a dispenser (waterproofing agent supplying device) 23 of the waterproofing agent 21 in a horizontal direction.

Figure 3C:
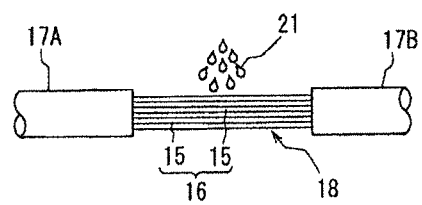

Subsequently, as shown in FIG. 3(C), the fluid waterproofing agent 21 having a required viscosity (e.g. 0.6 Pa·s) is dropped to the exposed core section 18 from above.

Figure 3D:
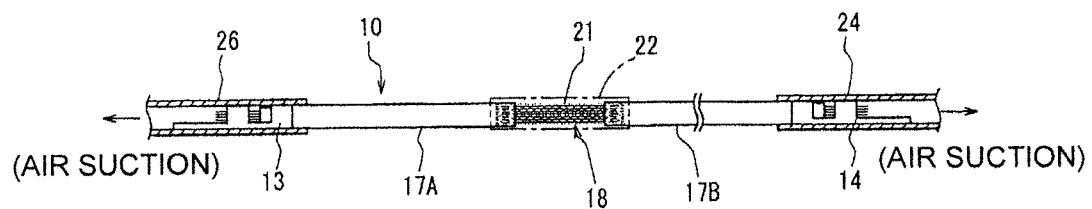

Subsequently, as shown in FIG. 3(D), simultaneously with the dropping of the waterproofing agent 21 or with the waterproofing agent 21 applied to the entire exposed core section 18, negative pressure is introduced into the insides of the insulating coating layers 17A, 17B from the opposite ends of the wire 10. Specifically, the opposite ends of the wire 10 are inserted into and coupled to air suction hoses 24 connected with a suction pump, air between the strands 15 inside the insulating coating layers 17A, 17B is sucked to reduce pressure from exposed core sections of the terminals 13 and 14 exposed between core barrels and insulating coating barrels.

By reducing pressure inside the insulating coating layers 17A, 17B, the waterproofing agent 21 applied to the exposed core section 18 is sucked and infiltrated into the insides of the insulating coating layers 17A, 17B from the slit end surfaces 17A1, 17B1, thereby being filled into the clearances between the strands 15 inside the insulating coating layers.

Simultaneously, the waterproofing agent 21 is also infiltrated into the clearances between the strands 15 in the exposed core section 18 to be filled between the strands 15, and is applied to the outer circumferential surface of the exposed core section 18.

The dropping of the waterproofing agent 21 and the introduction of the negative pressure from the ends of the wire 10 may be performed by one operation or a plurality of times at time intervals.

The waterproofing agent 21 infiltrated and filled into the clearances between the strands 15 in the exposed core section 18 and inside the insulating coating layers 17A, 17B at the opposite sides of the exposed core section 18 is hardened after the lapse of a specified time.

The waterproof sheet 22 is wound around the exposed core section 18 before or after the hardening of the waterproofing agent 21, thereby forming the waterproof part 11.

In the waterproof part 11 formed by the above method, the waterproofing agent 21 is filled in the clearances between the stands 15 of the exposed core section 18 and the entire outer circumferential surface of the exposed core section 18 is covered by the waterproofing agent 21, whereby water penetration can be prevented. Further, since the waterproofing agent 21 is filled in the clearances between the inner strands 15 close to the slit end surfaces 17A1, 17B1 inside the insulating coating layers 17A, 17B at the opposite sides of the exposed core section 18, the reliable waterproof part 11 is formed.

Thus, even if the ground terminal 14 at the end of the wire 10 is arranged in a water susceptible area and water enters the wire 10 from the end connected to the ground terminal 14 and penetrates through the clearances between the strands 15 in the wire 10, this water can be reliably stopped by the waterproof part 11 and water penetration to the terminal 13 at the other end connected with the connector 20 can be prevented.

Figure 4A:
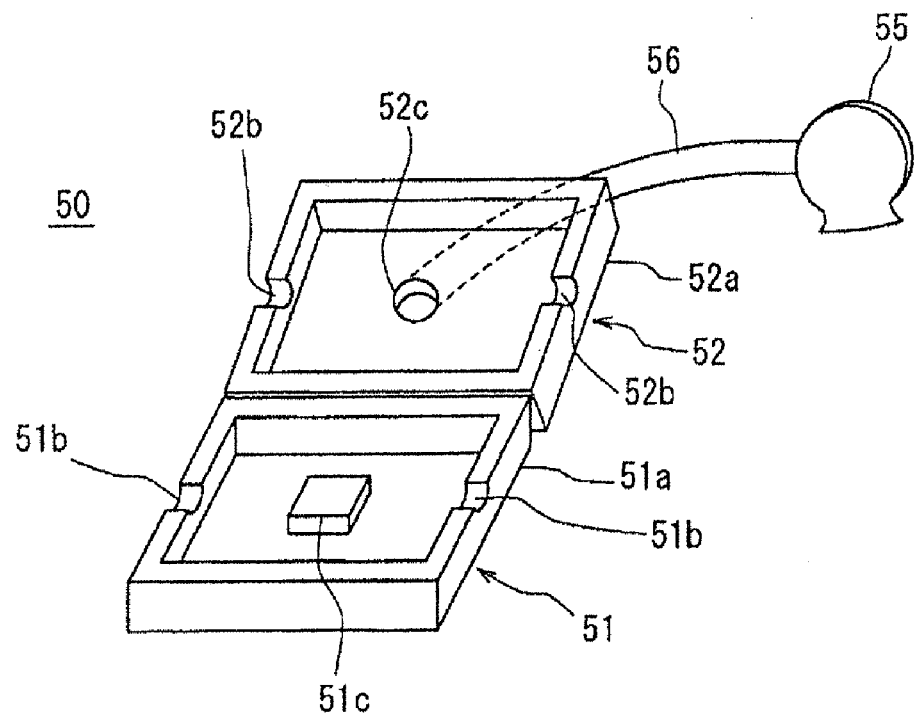
FIGS. 4(A) and 4(B) are perspective views showing a second embodiment.
Figure 4B:
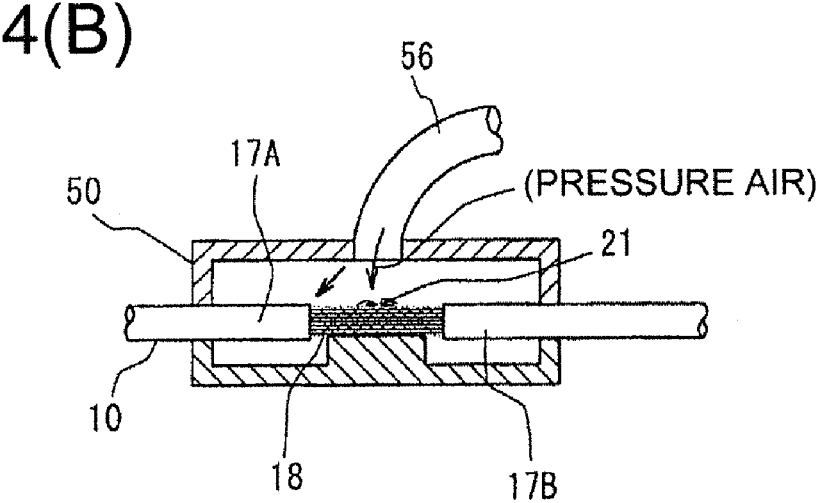

FIGS. 4(A) and 4(B) show a second embodiment.

In the above first embodiment, the negative pressure is introduced to the insides of the insulating coating layers 17A, 17B from the opposite ends of the wire 10 and the waterproofing agent 21 is sucked into the clearances between the strands 15 in the exposed core section 18 and into the insides of the insulating coating layers 17A, 17B by the negative pressure. However, in the second embodiment, the exposed core section 18 is loaded with pressure air to press the waterproofing agent 21 into the clearances between the strands 15 of the exposed core section 18 and into the insides of the insulating coating layers 17A, 17B at the opposite sides.

As shown in FIG. 4, a pressurized container 50 is provided to seal the exposed core section 18 and the insulating resin layers 17A, 17B at the opposite sides. The pressurized container 50 includes a lower container 51 and an upper container 52 hinged to the lower container 51 and is formed with semicircular grooves 51b, 52b in the centers of joint surfaces of side walls 51a, 52a of the upper and lower containers 51, 52. With the upper container 52 rotated to close the lower container 51, the wire 10 penetrates through the pressurized container 50 while being closely fitted in the grooves 51b, 52b.

The lower container 51 is shallow and a stepped projection 51c is provided in a central part of the bottom wall.

On the other hand, a pipe mount hole 52c is formed in the upper wall of the upper container 52 and the leading end of a pressure feed pipe 56 connected with a compressor 55 is coupled to the pipe mounting hole 52c.

With the upper container 52 of the pressurized container 50 fully opened, the exposed core section 18 of the wire 10 is positioned in the central part of the lower container 51, the insulating coating layers 17A, 17B at the opposite sides are placed in the semicircular grooves 51b of the opposite side walls of the lower container 51 and the exposed core section 18 is set on the stepped projection 51c.

In this state, the waterproofing agent 21 is dropped to the exposed core section 18. The wire 10 may be set in the lower container 51 immediately after the waterproofing agent 21 is dropped to the exposed core section 18.

After the wire 50 is set in the lower container 51, the upper container 52 is rotated to close the lower container 51. In this state, the semicircular grooves 52b of the upper container 52 are fitted to the upper semi-circumferential surfaces of the insulating coating layers 17A, 17B. In this way, the exposed core section 18 and the insulating coating layers 17A, 17B at the opposite sides are accommodated in a sealed manner in the upper and lower containers 52, 51.

Subsequently, pressure air of 50 to 300 kg/cm² is introduced into the pressurized container 50 via the pressure feed pipe 56 from the compressor 55.

By the introduced pressure air, the waterproofing agent 21 dropped to the exposed core section 18 is pressed into the clearances between the strands and also into the clearances between the strands inside the insulating coating layers 17A, 17B at the opposite sides of the exposed core section 18. At this time, since pressure is also exerted to the outer circumferential surfaces of the insulating coating layers 17A, 17B, only a small amount of the waterproofing agent 21 is pressed into the insides of the insulating coating layers 17A, 17B and the flow of the waterproofing agent 21 insides the insulating coating layers 17A, 17B can be prevented, wherefore the waterproofing agent 21 can be reliably pressed into the clearances between the strands of the exposed core section 18.

Thereafter, the wire 10 is taken out from the pressurized container 50 and the waterproof sheet 22 is wound around the exposed core section where the waterproofing agent 21 was filled and hardened, thereby forming the waterproof part.

If the waterproofing agent 21 dropped to the exposed core section 18 is filled into the clearances between the strands by being pressurized in this way, it is not necessary to introduce negative pressure from the ends of the wire and it is sufficient to set a part of the wire including the exposed core section 18 in the pressurized container and charge the pressure air. Thus, only the exposed core section 18 and the parts at the opposite sides of the exposed core section 18 are treated, wherefore a waterproofing apparatus can be miniaturized.

Figure 5:
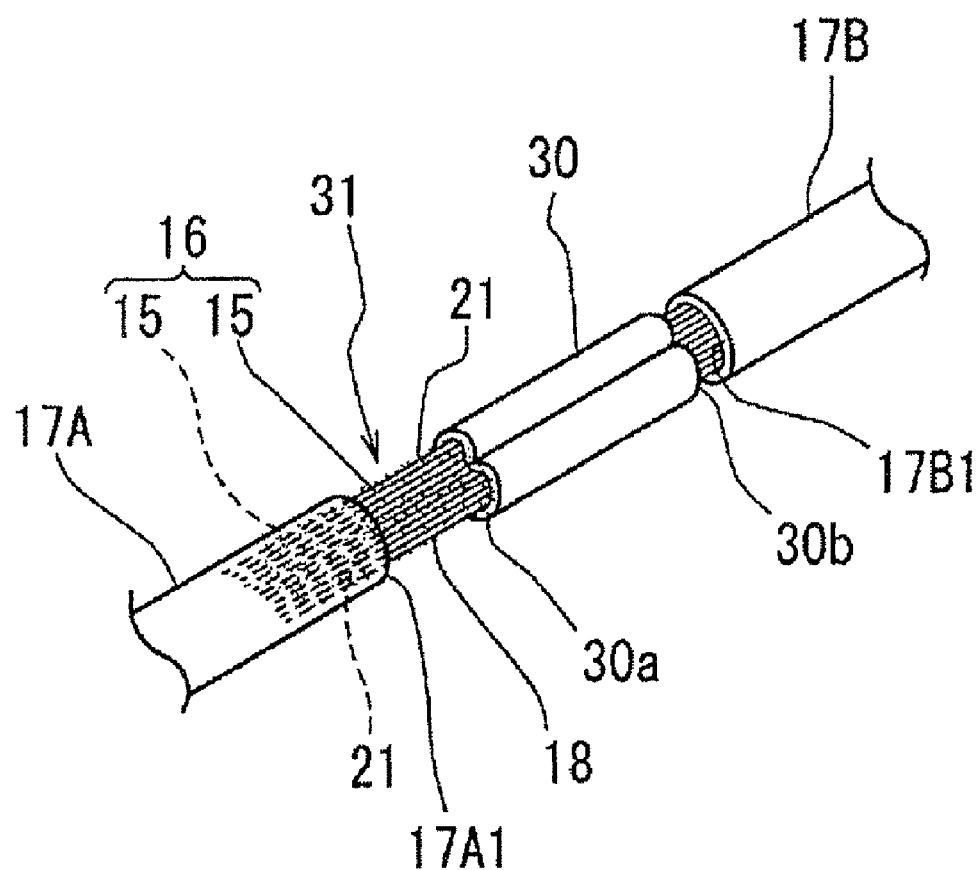
FIG. 5 is a diagram showing a wire including a waterproof part according to a third embodiment.
Figure 6:
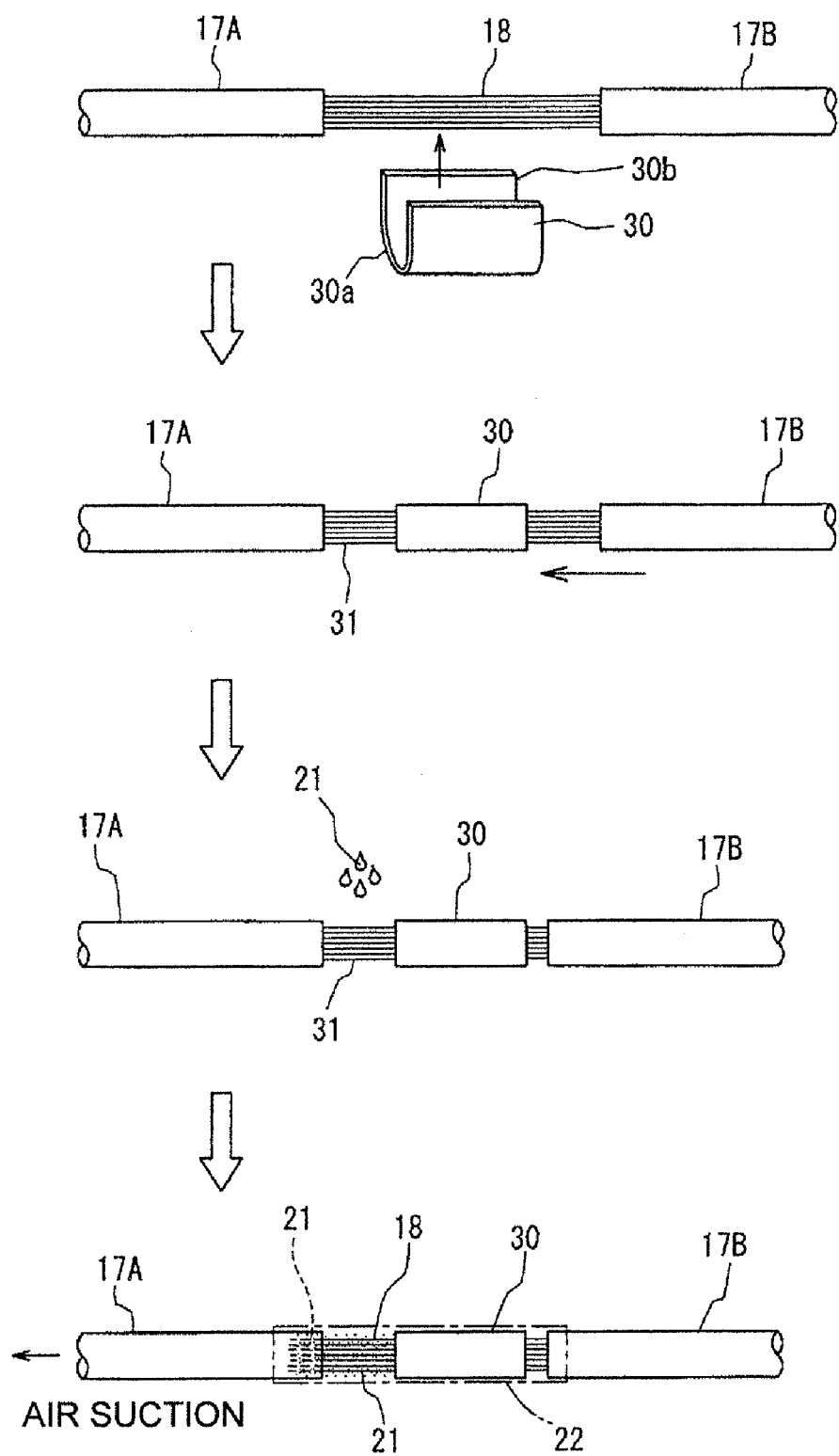
FIG. 6 is a diagram showing a method for forming the waterproof part according to the third embodiment.

FIGS. 5 and 6 show a third embodiment.

In the third embodiment, an intermediate crimping terminal 30 having a U-shaped cross section is crimped and connected to the exposed core section 18.

A waterproofing agent reservoir 31 having a required length is provided between one end 30a of the intermediate crimping terminal 30 in a lengthwise direction and the slit end surface 17A1 of the insulating coating layer 17A.

The waterproofing agent 21 is dropped into the waterproofing agent reservoir 31 from above and negative pressure is introduced from the end of the insulating coating layer 17A (i.e. end crimped and connected to the connector connecting terminal 13) as in the first embodiment to suck the waterproofing agent 21 from the slit end surface 17A1 in the insulating coating layer 17A.

An exposed core section is formed between another end 30b of the intermediate crimping terminal 30 and the slit end surface 17B1 of the other insulating coating layer 17B. However, since the insulating coating layer 17B is moved from the slit to form the exposed core section 18, the insulating coating layer 17B gradually returns to its initial position and, finally, almost no clearance is present between the other end 30b of the intermediate crimping terminal 30 and the slit end surface 17B1 of the insulating coating layer 17B.

Since the clearances between the strands 15 are first eliminated at a crimped position of the intermediate crimping terminal 30 in the waterproof part 11 according to the third embodiment, even if water penetrates in the clearances inside the insulating coating layer 17B from the ground terminal, water passing between the strands is blocked at the crimped position of the intermediate crimping terminal 30.

Further, since the waterproofing agent 21 is filled in the exposed core section 18 between the intermediate crimping terminal 30 and the insulating coating layer 17B and in the clearances between the strands 15 inside the insulating coating layer 17 at the side of the connector as in the first and second embodiments, water penetration to the connector connected end can be reliably prevented.

Further, since the length of the waterproofing agent reservoir 31 can be held constant in the second embodiment, the waterproofing agent 21 can be quantitatively controlled.

Although the waterproofing agent 21 dropped to the exposed core section 18 is sucked by the negative pressure introduced from the wire end in the third embodiment as in the first embodiment, it may be good to introduce pressure air into a set pressurized container and pressingly fill the waterproofing agent 21 dropped to the exposed core section 18 into the clearances between the strands as in the second embodiment.

Figure 7:
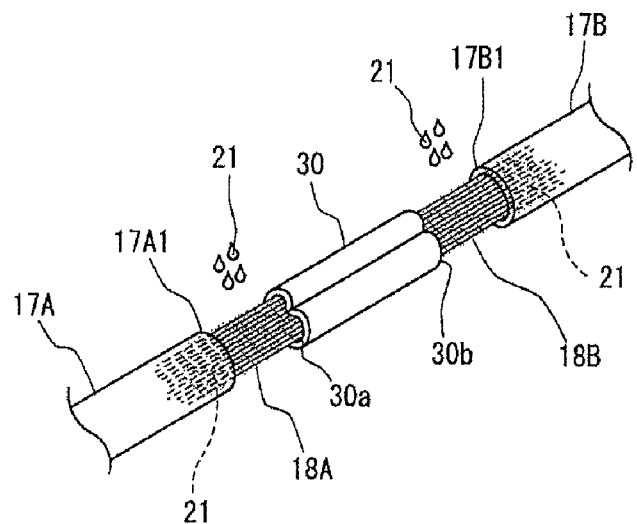
FIG. 7 is a diagram showing a waterproof part according to a fourth embodiment.
Figure 8:
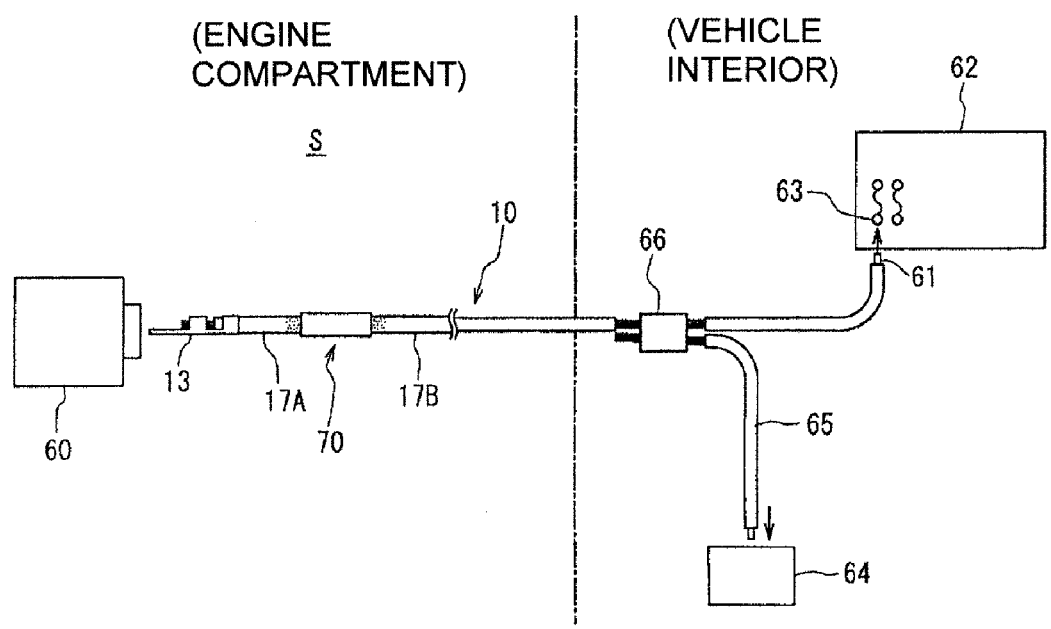
FIG. 8 is a diagram showing an arrangement path of a power wire according to the fourth embodiment.

FIGS. 7 and 8 show a fourth embodiment.

A wire 10 of the fourth embodiment is a power wire and has an end on the side of an insulating coating layer 17A connected with a connector connecting terminal 13 to be connected with a unit 60 arranged in a water susceptible area, which is an engine compartment, and the other end connected with a fuse terminal 63 of an electrical connection box 62 arranged in a vehicle interior as shown in FIG. 8. The wire 10 is also spliced to an end of a wire 65 to be connected with another unit 64 in a water free area in the vehicle interior. In the case of forming a waterproof part 70 in a water susceptible area S in the engine compartment between this spliced portion 66 and the connector connecting terminal of the wire 10, a construction shown in FIG. 7 is employed.

Specifically, a waterproofing agent 21 is dropped to both exposed core sections 18A, 18B formed between an intermediate crimping terminal 30 and slit end surfaces 17A1, 17B1 of insulating coating layers 17A, 17B and negative pressure is introduced form the opposite ends of the wire 10.

In other words, the waterproofing agent 21 is filled into clearances between strands 15 of the exposed core sections 18A, 18B, applied to the entire outer circumferential surfaces of the exposed core sections 18A, 18B and, as in the first embodiment, filled into clearances between strands inside the insulating coating layers 17A, 17B.

If the above construction is employed, water penetration to the spliced portion 66 can be blocked to prevent water penetration to the other wire 65 and no waterproof treatment is necessary at the spliced portion 66 even if the waterproof portion 70 is disposed in the water susceptible area S. Further, since water penetration to the terminal 61 connected with the other end of the wire 10 can also be blocked, water penetration into an electrical connection box 62 can be prevented.

In this way, the need for the waterproof treatment at the spliced portion 66 and the terminal 61 at the other end can be obviated by the waterproof treatment at the waterproof part 70.

Since the waterproofing agent penetrates into the insides of the insulating coating layers 17A, 17B at the opposite sides in the waterproof part also in the first embodiment, this construction is effective also for a wire of a power supply circuit.

If the wire 10 is similarly constructed also in the case of being a signal wire connected with a signal circuit in the electrical connection box 62, it is effective to provide waterproof parts at the opposite sides of the waterproof part 70.

Also in this fourth embodiment, instead of sucking the waterproofing agent 21 dropped to the exposed core section 18 by the negative pressure introduced from the wire ends, it may be good to introduce pressure air into a set pressurized container and pressingly fill the waterproofing agent 21 dropped to the exposed core section 18 into the clearances between the strands as in the second embodiment.

Figure 9:
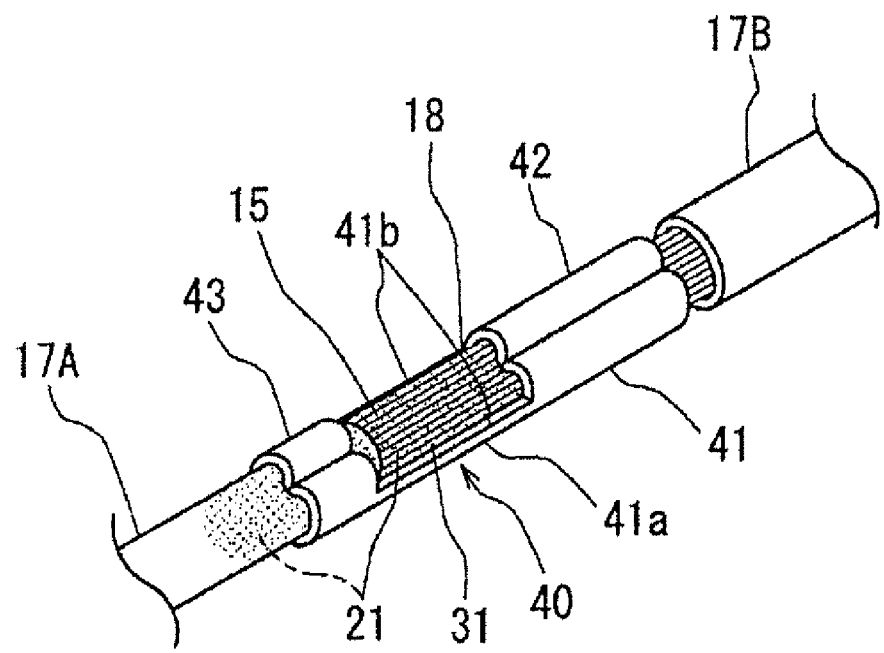
FIG. 9 is a diagram showing a wire including a waterproof part according to a fifth embodiment.
Figure 10:
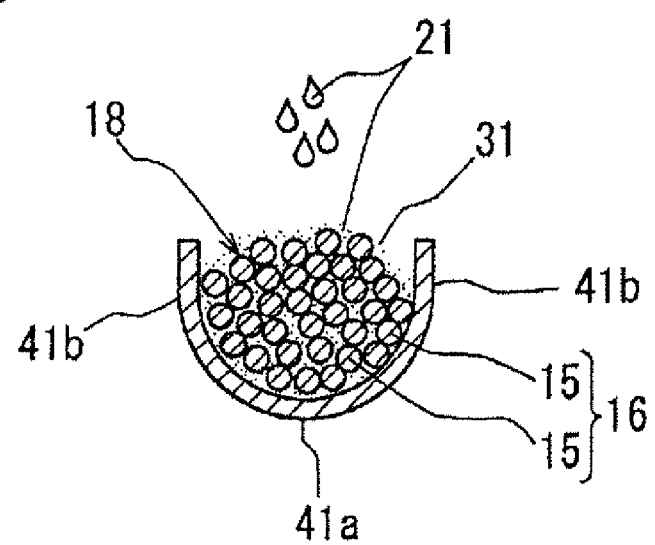
FIG. 10 is a section showing an essential part of the waterproof part according to the fifth embodiment.

FIGS. 9 and 10 show a fifth embodiment.

In the fifth embodiment, an intermediate crimping terminal 40 is so shaped that a core barrel 42 is provided at one end of a base plate 41 and an insulating coating barrel 43 is provided at the other end at a required distance from the core barrel 42. Side walls 41b project from the opposite widthwise ends of a base plate portion 41a between the core barrel 42 and the insulating coating barrel 43 to have a U-shaped cross section.

The core barrel 42 is crimped and connected at an intermediate position of an exposed core section 18 as in the third embodiment, whereas the insulating coating barrel 43 is crimped and connected to the outer circumferential surface of the exposed core section 18 near a slit end surface 17A1 of an insulating coating layer 17A at a connector connected side. The U-shaped base plate portion 41a between the crimped and connected barrels 42 and 43 is so arranged as to surround the lower and opposite side surfaces of the exposed core section 18 as a waterproofing agent reservoir 31.

A waterproofing agent 21 is dropped to the exposed core section 18 surrounded by the U-shaped base plate portion 41a. This dropped waterproofing agent 21 can be reliably prevented from leaking sideways by the opposite side walls 41b of the base plate portion 41a and the amount of the waterproofing agent 21 to be dropped can be quantitatively controlled by the presence of the waterproofing agent reservoir 31 as in the third embodiment.

As in the third embodiment, the waterproofing agent 21 dropped to the waterproofing agent reservoir 31 is sucked into the inside of the insulating coating layer 17A by the introduction of negative pressure from the end of the insulating coating layer 17A to be filled into clearances between inner strands, infiltrated and filled between strands of the exposed core section 18 as the waterproofing agent reservoir 31 and applied to the entire outer circumferential surface.

Also in this fifth embodiment, instead of sucking the waterproofing agent 21 dropped to the exposed core section 18 by the negative pressure introduced from the wire ends, it may be good to introduce pressure air into a set pressurized container and pressingly fill the waterproofing agent 21 dropped to the exposed core section 18 into the clearances between the strands as in the second embodiment.

Figure 11A:
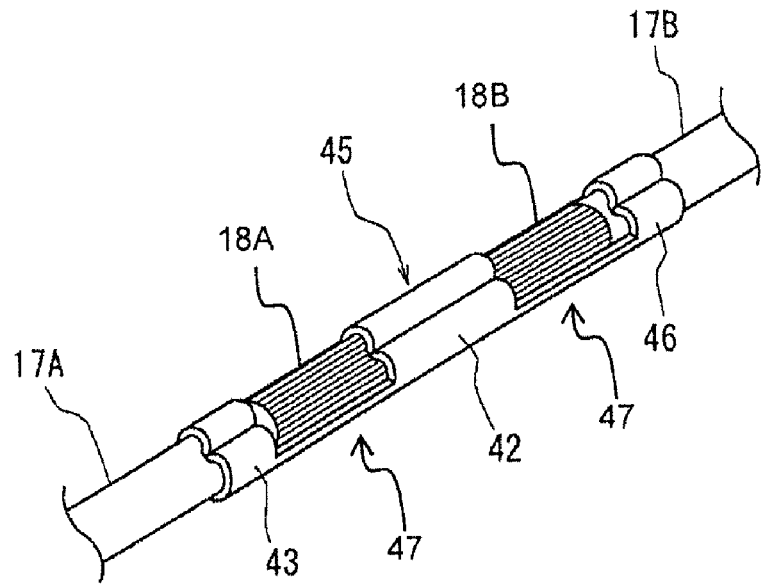
Figure 11B:
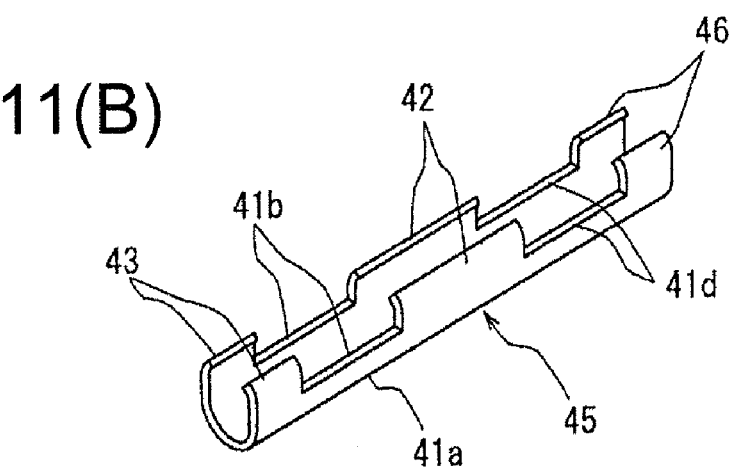
Figure 12:
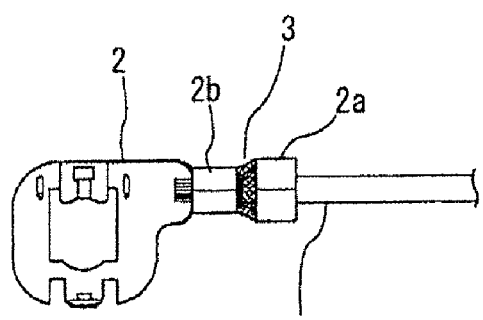
FIG. 12 is a diagram showing a prior art.
Figure 13A:
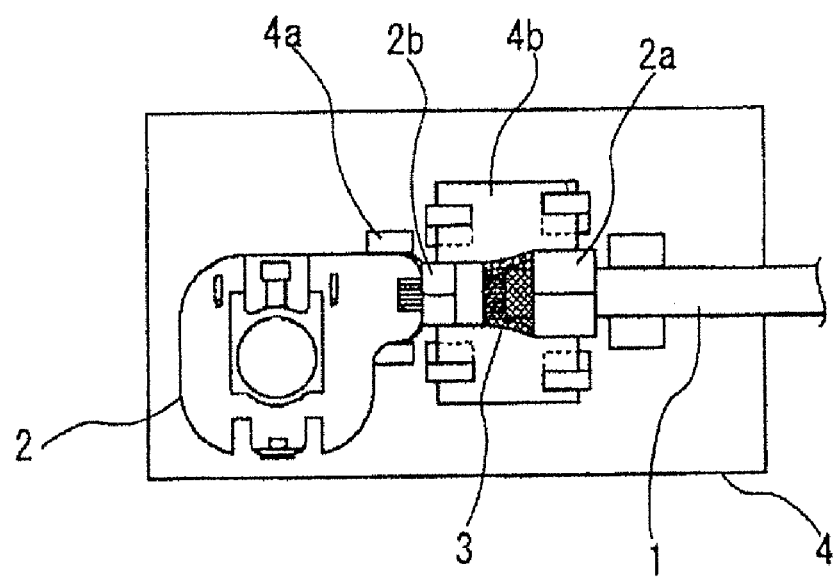
FIGS. 13(A) and 13(B) are diagrams showing another prior art.
Figure 13B:
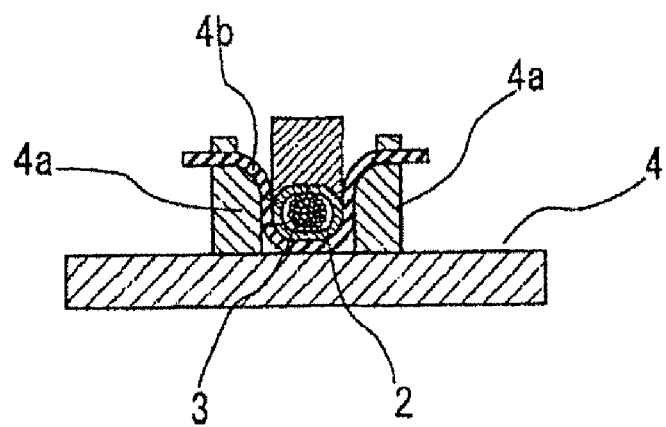

FIG. 11 show a modification of the fifth embodiment.

In this modification, an intermediate crimping terminal 45 includes a core barrel 42 and insulating coating barrels 43, 46 at the opposite sides of the core barrel 42, and the insulating coating barrels 43, 46 are crimped and connected to insulating coating layers 17A, 17B at the opposite sides of an exposed core section 18. A base plate portion 41c between the core barrel 42 and the insulating coating barrel 46 is also provided with side walls 41d to have a U-shaped cross section, and surrounds the lower and opposite side surfaces of an exposed core section 18B as a waterproofing agent reservoir 47 between the core barrel 46 and the insulating coating barrel 46.

In this way, as in the fourth embodiment, the dropped waterproofing agent 21 can be reliably prevented from leaking sideways in the case of dropping the waterproofing agent 21 to the both exposed core sections 18A, 18B.

A wire having a waterproof part formed by the waterproofing method of the present invention can be applied as a wire to be arranged in a water susceptible area of a car or a motorcycle. Particularly, wires arranged in motorcycles have a high possibility of being arranged in a water susceptible area and a place where a ground terminal can be fixed to a vehicle body is restricted as compared with cars. Therefore, the above wire can be most suitably used as a ground wire to be arranged in a motorcycle.

What is claimed is:

1. A wire waterproofing method for a wire to be arranged in a water susceptible area of a vehicle, the wire having a core made up of a plurality of strands covered by an insulating coating layer, wherein the method comprises:
   removing the insulating coating layer in a lengthwise intermediate part of the wire to expose the core, and
   dropping a fluid waterproofing agent to the exposed core section and at the time of or after the dropping of the waterproofing agent:
   infiltrating the waterproofing agent into clearances between the strands of the exposed core section, inserting a part of the wire where the waterproofing agent is dropped and parts of the insulating coating layers at the opposite sides of the part of the wire where the waterproofing agent is dropped in a pressurized container in a sealed manner, supplying pressure air of 50 to 300 km/cm$^2$ into the pressurized container to press the dropped waterproofing agent into the exposed core section and the inside of the insulating coating layer, and thereby infiltrating the waterproofing agent between the strands of the core inside the insulating coating layer.

2. A wire waterproofing method according to claim 1, wherein:

an intermediate terminal is connected to a part of the exposed core section by crimping, welding, fusing or soldering while being spaced apart from an end surface of a part of the insulating coating layer abutting on the exposed core section at one end side, the exposed core section located between one end surface of the intermediate terminal and the end surface of the part of the insulating coating layer at the one end side serves as a waterproofing agent reservoir, and the negative pressure is introduced from the other end of the part of the insulating coating layer at the one end side to suck the waterproofing agent into the inside of the part of the insulating coating layer at the one end side of a waterproofing agent reservoir is loaded with pressure air to press the waterproofing agent into the inside of the part of the insulating coating layer at the one end side.

3. A wire waterproofing method according to claim 2, wherein:

the waterproofing agent is dropped to an exposed core section between the other end surface of the intermediate terminal and the end surface of the part of the insulating coating layer at the other end side, and the negative pressure is introduced from the wire end at the other end side to suck the waterproofing agent into the inside of the insulating coating layer or the exposed core section is loaded with the pressure air to press the waterproofing agent into the inside of the insulating coating layer.

4. A wire waterproofing method according to claim 2, wherein:

the intermediate crimping terminal includes a core barrel to be crimped and connected to the strands of the exposed core section at one end of a base plate and an insulating coating barrel at the other end of the base plate at a distance equal to the length of the waterproofing agent reservoir from the core barrel, the insulating coating barrel is crimped and connected to the insulating coating layer, and bent wall portions are provided at the opposite widthwise sides of the base plate located at the lower surface of the waterproofing agent reservoir between the both barrels to surround a lower part of the exposed core section by the wall portions and the base plate.

5. A wire waterproofing method according to claim 1, wherein the waterproofing agent is made of silicone resin.

6. A wire, comprising a waterproof part formed by a waterproofing method according to claim 1.

7. A wire according to claim 6, wherein:

the wire is a ground wire having one end connected with a ground terminal and the other end connected with a connector connecting terminal and the ground terminal is to be fixed to a body panel in a water susceptible area, the waterproof part formed by the waterproofing method is provided at an intermediate position close to the connector connecting terminal at the other end of the ground wire, and negative pressure is introduced from an end at the side of the connector connecting portion to infiltrate and fill the waterproofing agent into clearances between strands inside an insulating coating layer at a connector connecting side.

8. A wire according to claim 6, wherein:

the wire is a power wire or a signal wire having one end connected with a connector connecting terminal and spliced to another wire in a water free area, the connector connecting terminal is connected with an end of the spliced other wire, the waterproof part is provided at an intermediate position between a spliced position and the end connected with the connector connecting terminal, and the waterproofing agent is filled into the exposed core section of the waterproof part and between the strands inside insulating coating layer parts at the opposite sides of the exposed core section.

9. A wire according to claim 6, wherein a waterproof sheet or a waterproof tape is wound around the waterproof part.

10. The method of claim 1, wherein a step of generating a pressure differential comprises introducing a negative pressure inwardly of first and second sections of the insulating coating layer from locations spaced from the exposed core section.

11. A method for waterproofing a wire to be arranged in a water-susceptible area of a vehicle, comprising:

providing a wire having a core formed from a plurality of strands and an insulating coating layer covering the core;

removing a lengthwise intermediate part of the insulating coating layer to form an exposed core section between first and second spaced-apart sections of the insulating coating layer;

connecting an intermediate terminal to the exposed core section;

dropping a fluid waterproofing agent on the exposed core section so that the fluid waterproofing agent infiltrates into clearances between the strands of the exposed core section; and generating a pressure differential between the exposed core section and areas inwardly of the first and second sections of the insulating coating layer by inserting the exposed core section and areas of the first and second sections of the insulating coating layer adjacent to the exposed core section into a container, sealing the container and then supplying air pressure of 50 to 300 km/cm$^2$ into the container so that pressure at the exposed core section exceeds pressure inwardly of the first and second sections of the insulating coating layer for causing the waterproofing agent to infiltrate between the strands of the core inside the insulating coating layer.

12. The method of claim 11, wherein the step of generating a pressure differential comprises loading areas surrounding the exposed core section with high pressure air for pressing the waterproofing agent between the strands of the core inside the first and second sections of the insulating coating layer.

13. The method of claim 11, wherein the step of dropping the fluid waterproofing agent comprises dropping the waterproofing agent at least at first and second locations on the exposed core section disposed at opposite respective ends of the intermediate terminal.

14. The method of claim 11, wherein the step of connecting the intermediate terminal to the exposed core section comprises crimping the intermediate terminal to the exposed core section.

15. The method of claim 11, further comprising winding a waterproof sheet or a waterproof tape around the exposed core section and the intermediate terminal after the waterproofing agent has been applied to the exposed core section and infiltrated into areas inwardly of the first and second sections of the insulating coating layer.

* * * * *